Oct. 20, 1942.   W. F. SHULTZ   2,299,599
VALVE
Filed Sept. 2, 1941

INVENTOR
WILLIAM F. SHULTZ
BY
Wheeler, Wheeler & Wheeler
ATTORNEYS.

Patented Oct. 20, 1942

2,299,599

UNITED STATES PATENT OFFICE 2,299,599

VALVE

William F. Schultz, Ripon, Wis.

Application September 2, 1941, Serial No. 409,161

7 Claims. (Cl. 251—115)

This invention relates to improvements in valves. The present application is a companion to an application for patent on a liquid meter using the valve herein disclosed. The aforesaid application Serial No. 409,160 was filed September 2, 1941, and entitled Float controlled meters. The valve, however, has characteristics making it desirable for use for purposes other than the meter disclosed in the companion application above identified.

It is the primary object of the invention to provide a novel and simplified form of valve capable of being opened with a minimum of friction and wear under any pressure to which the valve may be subject and which, at the same time, will be smooth and noiseless in operation.

It is a further and very important object of the invention to provide a valve which will open and close without necessarily moving to and from its seat, and which is so universally responsive that it will open in response to pressure exerted upon its stem in any direction whatever other than the single direction in which the valve is pressed to its seat.

In the drawing:

Fig. 5 is a view in axial section through a slightly modified embodiment of the invention as developed for the hydraulic control of a duplicating mechanism or the like.

Like parts are identified by the same reference characters throughout the several views.

Figure 1:
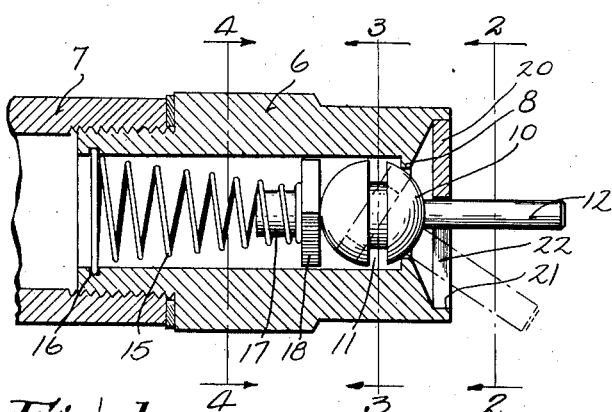
Fig. 1 is a view in axial section through a valve embodying the invention.
Figure 2:
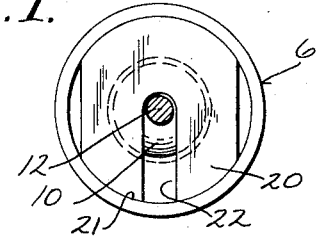
Fig. 2 is a view showing the valve in end elevation, the stem being cut in section on the line 2—2 of Fig. 1.
Figure 3:
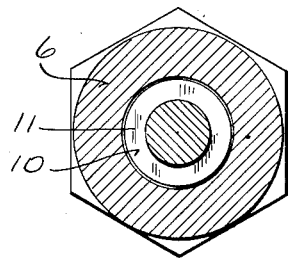
Fig. 3 is a cross section through the valve mechanism on the line 3—3 of Fig. 1.
Figure 4:
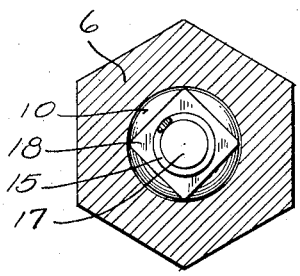
Fig. 4 is a view in cross section through the valve mechanism on the line 4—4 of Fig. 1.

The valve casing 6 may be connected in any desired manner to supply pipe 7. At the discharge end of the casing there is means, such as the internal flange 8, providing a valve seat with which the valve 10 is engaged. The valve is preferably of spherical form and provided with a peripheral groove at 11 in a diametrical plane to which the stem 12 is normal. As compared with a diametrical hole, which would be effective in only one plane of valve oscillation, the groove as herein disclosed, is a form of opening in the valve body which permits the valve to respond to opening pressures in any direction of oscillation upon its seat, as will hereinafter be explained.

The valve is held to its seat by the compression spring 15 which is of spiral form, having its larger end engaged in a groove 16 in the valve casing, while its smaller end engages the post 17 of a spring guide member 18 which may take the form of a square block having its corners loosely confined within the cylindrical barrel of the valve casing 6, leaving ample clearance about the flat sides of the block for the passage of fluids to the valve. The block bears against the spherical inner end of the valve member 10 and transmits the pressure of spring 15 axially of the valve casing in the direction of the seat.

Regardless of the direction in which pressure is exerted upon the stem 12 (with the single exception of axial tension on the stem) the valve will be opened either by the bodily displacement of the valve from the seat 8 or by its oscillation upon the seat toward the position shown in dotted lines in Fig. 1. In the dotted line position of the valve the channel or groove 11 passes across the effective margin of the seat 8 to provide an opening through the seat.

Thus, the valve may be opened and closed without ever leaving its seat, by simply oscillating thereon. Regardless of the pressures handled by the valve, its action will always be smooth and easy. It is closed with equal facility by simply restoring the stem 12 to axial alignment with the barrel seat to withdraw the channel 11 of the ball entirely to one side of the seat.

One great advantage of this construction is that the valve is self-cleaning. Any gritty material carried by a fluid in the line supplying the valve, is wiped by the seat from the surface of the valve in the course of valve oscillation so that it never accumulates between the valve and the seat to prevent proper seating.

Where universal response of the valve is not desired, the plate 20 may be inserted in the recess provided at 21 in the end of the valve casing. This plate has a radial slot at 22 in which the valve stem is confined and constrained for movement in one plane only.

Figure 5:
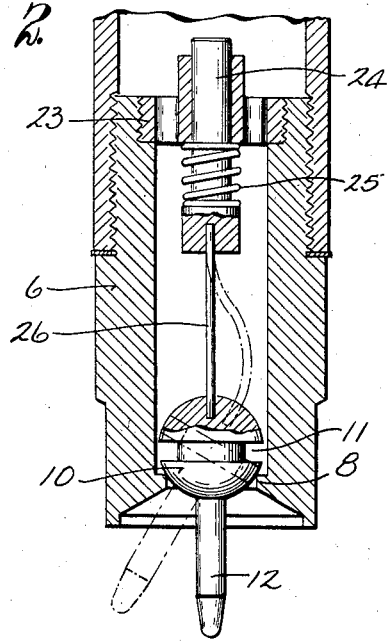

As used in the meter disclosed in the companion application above identified, the valve stem is constrained to rectilinear movement by the plate 20, and the arrangement is also such that the valve remains in any position to which it is adjusted. However, in Fig. 5 I have shown one organization in which the valve may be used in which the valve is universally responsive to pressure in any direction and is also self-closing irrespective of the direction in which the opening pressure has been applied.

In this construction a spider 23 screwed into the inlet end of the valve casing 6, serves as a guide for a rod 24 urged by compression spring 25 toward the valve seat 8. The rod or plunger 24 does not bear directly upon the valve 10. There is interposed between the rod 24 and the valve a piece of piano wire or the like at 26 which is yieldable in any lateral direction but is sufficiently strong to transmit to the valve the axial thrust of compression spring 25. This spring may be socketed at its ends in the rod 24 and the valve 10 respectively.

Any pressure having a substantial axial component directed against the stem 12 will tend to lift the valve 10 bodily from seat 8, but any pressure having a substantial lateral component in any direction will oscillate the valve upon seat 8 to open the valve by allowing the channel or groove 11 to traverse the plane of the seat. Such motion will be accommodated by the flexing of the spring wire 26 as shown in dotted lines in Fig. 5 and upon the relief of the pressure to which the stem is subject the resilience of the spring 26 will restore the valve to center, thereby cutting off communication through the seat by means of the groove 11. The combination of the yieldable rod, spring biased toward the seat, and the yieldable spring wire spring biased toward an axially central position, accommodates universal movement for the opening thereof and at the same time resiliently restores the valve to closed position when the opening pressure is relieved.

This form of the device is usable as shown in hydraulically controlled tracing mechanisms for duplicating machines, the arrangement being such that the duplicating mechanism will respond to any relief of pressure in pipe 7 and the pressure in pipe 7 will be relieved by discharge through the valve whenever the stem 12 is engaged by a thrust in any direction whatever, either axial or lateral.

While the valve has been described, in accordance with standard practice, as controlling a fluid pressure differential such as to tend to urge the valve toward its seat, the fact will be apparent to those skilled in the art that actually the direction of flow is immaterial and, provided the valve spring means is sufficiently strong, the pressure differential to which the valve is subjected may be such as to be exerted in opposition to the spring. This does not necessarily involve any essential change in structure, since it may depend merely on the question whether the pipe 7 is connected with a source of pressure or a source of vacuum. The valve, however, is susceptible of substantial modification to meet special conditions of use without any change in the principle here involved.

I claim:

1. In a valve, the combination with a casing providing a valve seat, of a substantially spherical valve body oscillatable universally upon the seat, a stem projecting from said body beyond said seat for the oscillation of said body, and spring means biasing said valve to said seat, said valve being provided immediately within the seat with an annular peripheral channel normally spaced by portions of said valve body from said seat and adapted upon the oscillation of said body in any direction to pass the plane of said seat, whereby to provide flow through said seat.

2. A valve of the character described, comprising means providing a valve seat, a valve body oscillatable upon the seat and having a convex surface engaged therewith and an opening from one side of the body to the other, normally lying immediately adjacent the seat and wholly at one side thereof, said opening being adapted to pass the plane of the seat when said body is oscillated thereon, and means biasing said valve body toward a central position in which said opening lies wholly at one side of the seat.

3. A valve of the character described, comprising the combination with a casing providing a seat, of a valve body having a convex surface oscillatable upon the seat and provided with a peripheral channel adapted in an intermediate central position of said body to lie wholly at one side of the seat, said channel being so located that in the oscillation of said body upon said seat said channel will pass the plane of the seat to afford flow therethrough, and spring means biasing said valve body toward said central position.

4. The device of claim 2 in which said spring means includes a valve seating spring portion and a valve centering spring portion.

5. The device of claim 2 in which said spring means includes an axial spring resiliently biased toward central position and yieldable universally in a lateral direction from such position, and an associated compression spring arranged to exert its pressure lengthwise of said axial spring in a direction to urge said valve body to its seat, said axial spring being interposed between said valve body and said compression spring.

6. The device of claim 2 in which said spring means comprises piano wire spring connected with the valve body and normally projecting axially away from the valve seat, said piano wire spring being resiliently flexible laterally in any direction responsive to the universal oscillation of the valve body upon its seat, a rod provided with a guide upon which the rod is axially yieldable away from the seat, and a compression spring urging said rod toward the seat, said piano wire spring being engaged with said rod to receive the thrust of said compression spring and to transmit said thrust to said valve body to maintain said body in operative engagement with its seat.

7. In a valve, the combination with a casing providing a valve chamber and a valve seat, of a valve body oscillatable respecting the seat, said body being provided with a convexly rounded flow arresting portion normally engaged with said seat and with an annular groove normally disposed wholly within the chamber but adapted upon the oscillation of said body to be projected across the plane of the seat, whereby to permit flow therethrough, a compression spring in said chamber, and a follower member provided with a spring seat and having a valve body engaging portion adapted to transmit spring pressure to the valve body to hold such body to its seat while permitting oscillation of the valve body between said seat and follower member, said follower member including means engageable with said casing for positioning said follower member centrally in said chamber.

WILLIAM F. SCHULTZ.